United States Patent [19]
DeWacker et al.

[11] Patent Number: 5,512,619
[45] Date of Patent: *Apr. 30, 1996

[54] DISSIPATIVE CURING AND COATING COMPOSITION FOR CONCRETE

[75] Inventors: Dennis R. DeWacker, Belle Mead; Leon Rosenberg, Bridgewater; Nicholas J. Lacamera, Jr., Somerville, all of N.J.

[73] Assignee: National Starch and Chemical Investment Holding Corporation, Wilmington, Del.

[ * ] Notice: The term of this patent shall not extend beyond the expiration date of Pat. No. 5,360,847.

[21] Appl. No.: 225,294

[22] Filed: Apr. 8, 1994

Related U.S. Application Data

[63] Continuation-in-part of Ser. No. 4,880, Jan. 19, 1993, Pat. No. 5,360,847.

[51] Int. Cl.⁶ .............. C08K 5/15; C08L 1/00; C08L 3/00; C08L 5/02
[52] U.S. Cl. .............. 524/56; 524/35; 524/47; 524/48; 524/50; 524/51; 524/54; 524/55; 427/385.5; 427/393.6; 427/403
[58] Field of Search .............. 523/128; 524/35, 524/47, 48, 50, 51, 54, 55, 56, 377, 376; 427/403, 485.5, 393.6

[56] References Cited

U.S. PATENT DOCUMENTS

| | | | |
|---|---|---|---|
| 4,055,694 | 10/1977 | Hadgraft et al. | 524/50 |
| 4,342,672 | 8/1982 | Lindroth et al. | 524/55 |
| 4,568,714 | 2/1986 | Overholt | 524/47 |
| 5,004,767 | 4/1991 | Krause et al. | 524/47 |
| 5,055,504 | 10/1991 | Mahil et al. | 524/48 |

FOREIGN PATENT DOCUMENTS

| | | | |
|---|---|---|---|
| 37000/68 | 4/1968 | Australia. | |
| 2947527 | 11/1979 | Germany. | |
| 56-201768 | 12/1981 | Japan. | |
| 62-184936 | 7/1987 | Japan. | |
| 0323281 | 1/1991 | Japan. | |
| 0874698 | 10/1981 | U.S.S.R. | 524/54 |

Primary Examiner—Paul R. Michl
Assistant Examiner—LaVorda R. DeWitt
Attorney, Agent, or Firm—William K. Wissing

[57] ABSTRACT

A curing composition for concrete that is an effective water barrier and that is relatively easily removed contains an acrylic or a styrene polymer latex and a polysaccharide. The polysaccharide makes the coating composition susceptible to enzyme action and thus easily removable by flooding the surface of the coated concrete with a dilute solution of enzyme reactive with the polysaccharide.

12 Claims, No Drawings

DISSIPATIVE CURING AND COATING COMPOSITION FOR CONCRETE

This application is a continuation-in-part of application Ser. No. 08/004,880, filed Jan. 19, 1993, now U.S. Pat. No. 5,360,847, issued Nov. 1, 1994.

FIELD OF THE INVENTION

This invention relates to curing or coating compositions for concrete that act as a temporary water vapor barrier and seal until the concrete cures.

BACKGROUND OF THE INVENTION

A temporary curing compound is customarily coated onto fresh concrete to prevent the evaporation of water, forcing the cement to hydrate and set, and to prevent the intrusion of water, salts or other contaminants into the concrete. The concrete coating industry requires that these curing compounds meet the requirements of ASTM C 309 (American Standard Test Methods) for water retention properties. Historically, curing compounds have been organic solutions of chlorinated rubbers, styrene copolymers, acrylic copolymers, hydrocarbon emulsions, oils and the like. Recently, fine particle size styrene copolymer and acrylic copolymer dispersions have been developed that address the performance requirements of cure and seal compounds and that comply with volatile organic emission restrictions. These compounds form tough films and are effective water vapor barriers and sealants. For some final uses these films must be removed after the concrete cures, and generally the removal requires time-consuming and strenuous mechanical abrasion, such as sand-blasting. This has created a need for an aqueous coating composition for concrete that has good water barrier and sealant properties, that complies with standards for restricting volatile organic compound emissions, and that is removable without the expenditure of the time and labor now required.

SUMMARY OF THE INVENTION

This invention is an improved curing or coating composition for concrete that meets the water vapor barrier requirements of ASTM C309, which is hereby incorporated by reference in its entirety, is more easily removable than curing compositions now in commercial use, and complies with volatile organic compound emission restrictions. As used herein, the terms "curing composition" and "coating composition" may be used interchangeably and refer to compositions which are applied to uncured concrete substrates and form films thereon to prevent evaporation of water during the curing of the concrete substrate. The improvement comprises the addition of a polysaccharide to a polymeric latex formulated as a concrete curing composition. When the concrete is completely cured, the curing composition can be removed by flooding the surface of the concrete with water and abrading. The presence of the polysaccharide aids in making the film coating more susceptible to the aqueous abrasion. In a preferred embodiment, the curing composition comprises in admixture a polysaccharide susceptible to enzyme action and a latex of a polymer used in concrete curing compositions, hereinafter polymer latex. After the concrete has cured, the curing composition is removed by contacting the curing composition with an enzyme, preferably by flooding the surface of the concrete with an aqueous solution of enzyme reactive with the polysaccharide and allowing the enzyme to degrade the polysaccharide. The degradation of the polysaccharide breaks down the integrity of the polymeric film making it removable with less mechanical abrasion than would normally be needed. The polysaccharide is blended with the latex polymer in an amount at about 5–40%, preferably 10–20%, by weight of total solids of the curing composition.

In another embodiment this invention is a method for curing concrete that comprises: (a) applying to a concrete substrate a curing composition for concrete that comprises by weight of the total solids of the composition 95–60% of a water dispersible hydrophobic polymer and 5–40% of a polysaccharide; (b) allowing the concrete to cure; and (c) removing the curing composition from the concrete substrate.

DETAILED DESCRIPTION OF THE INVENTION

As will be appreciated, it is possible to prepare a coating or curing composition in accordance with this invention based on any of the commercially used concrete curing compounds; however, in order to avoid the use of volatile organic solvents for environmental reasons, aqueous dispersions or latexes are preferred over solutions of polymers in organic solvents. The preferred base for the curing composition of this invention is a polymer latex or aqueous dispersion of any polymer that will meet the ASTM C 309 criteria for concrete curing compounds. The more preferred polymers are acrylic polymers or copolymers or styrene polymers or copolymers having a glass transition temperature (Tg) in the range +25°–100° C., preferably 40°–75° C., Tg.

Suitable styrene and acrylic polymers and copolymers are hydrophobic, well known in the art, and can be prepared by known emulsion polymerization techniques. Alternatively, useful hydrophobic polymers are commercially available, for example, under the tradenames Nacrylic from National Starch and Chemical Company, Bridgewater, N.J.; Rhoplex from Rohm & Haas, Philadelphia, Pa.; Pliolite from Goodyear, Akron, Ohio; and Dow SBR from Dow Chemical, Midland, Mich.

These polymer latexes or dispersions typically are non-film forming at room temperature and may require a coalescing agent to aid in film formation. Coalescing agents are well known and used in the art to provide effective film formation under a wide range of temperatures, typically from +4° to +38° C., depending on geographic location, season, or time of day. Exemplary coalescing agents suitable for use in concrete curing compositions are ethylene glycol monobutyl ether acetate, 2,2,4-trimethyl-1,3-pentanediol mono-isobutyrate and dipropylene glycol monobutyl ether. A coalescing agent that is highly hydrophobic is preferred because it will strongly partition into the polymer or resin phase of the emulsion. A preferred coalescing agent is the hydrophobic 2,2,4-trimethyl-1,3-pentanediol mono-isobutyrate. The exact amount of the coalescing agent needed will depend on the latex polymer Tg and drying conditions. In general, the coalescing agent will be present in an amount at about 7–15% by weight of the emulsion.

The polymer latexes or dispersions may also contain other commonly used additives, such as plasticizers, defoamers, and bacteriocidal agents, and the use and amount of these agents is well known to those skilled in the art. Suitable plasticizers, for example, are benzoate plasticizers (such as Benzoflex 50, a product of Velsicol, Chattanooga, Tennessee), and dibutyl phthalate. The plasticizers will be present in an amount from 1–15% by weight of emulsion. A suitable defoamer, for example, is Witco 3056A (a product of Witco Chemical Co., Chicago, Ill.). Defoamers will be present in an amount from 0.1–1% by weight of emulsion. Bacteriocidal agents are commonly used, and when used are present in an amount from 0.01–0.5% by weight of emulsion. Suitable bacteriocidal agents can be purchased commercially under the tradenames Kathon from Rohm & Haas in Philadelphia, Pa.; Proxcel from ICI America, Wilmington, Del.; and Tektemer from Merck in Rahway, N.J. When additives are used, they are simply added to the emulsion with moderate agitation during formulation. These compositions can be stable for up to a year, or even longer depending on the amount of bacteriocidal agent added.

In accordance with this invention, a suitable polymer latex or dispersion is blended with a polysaccharide such that the hydrophobic polymer or copolymer is present in an amount at about 95–60% by weight of the total solids of the curing composition and the polysaccharide is present in an amount at about 5–40% by weight of total solids of the curing composition. The addition of the polysaccharide causes no appreciable reduction in water barrier properties and considerable increase in ease of removability. Although no particular total solids content is critical, for practical reasons due to viscosity of the polymer latex and solids needed for film formation, the total solids content is typically in the range of 10–50% by weight. For the compositions exemplified below, a practicable and suitable total solids content was in the range of 20–25%.

In some cases, the enzyme action on the polymer/polysaccharide film is reduced by the high water resistance of the hydrophobic polymer. To prevent this, the curing composition can be formulated with the addition of a dilute solution of enzyme specific to the polysaccharide. In the examples described below, the amount of enzyme added was an excess, based on the manufacturer's data sheet, capable of degrading 100% of the polysaccharide in the curing composition. Nevertheless, that excess did not prevent the formation of a coating that met the water vapor barrier requirements of C 309. As will be understood, the formulation of less enzyme into the curing composition would be sufficient to counteract the hydrophobicity of the polymer, and the determination of the least amount needed is within the expertise of one skilled in the art.

The polysaccharides that are suitable for blending with the hydrophobic polymers are enzyme susceptible and include starches, celluloses, and gums. In preferred embodiments, the polysaccharides are substantially cold water soluble to allow for efficient and practical dissolution, dispersions or mixture in water or the polymer latex. The polysaccharide is made up into an aqueous solution or dispersion and blended with the polymer latex using moderate agitation. Alternatively, the polysaccharide can be dispersed or blended directly into the polymer latex. Suitable starches for blending with the hydrophobic polymeric starting compound may be from any source, for example, from corn, potato, sweet potato, wheat, rice, sago, tapioca, and sorghum. These starches may be chemically modified to ether or ester derivatives; degraded by use of enzymes, acid or oxidizing agents; crosslinked, for example, with epichlorohydrin, phosphorus oxychloride, sodium trimetaphosphate or mixed anhydrides; pregelatinized by drum drying, spray drying or extrusion; and they may be cationic, anionic, or amphoteric. The examples show a selection of suitable starches.

Suitable celluloses are Methocel from Dow Chemical in Midland, Mich.; and Natrosol from Aqualon, Wilmington, Del. Suitable gums are guar, locust bean, arabic, and tragacanth.

The final polymer/polysaccharide curing composition is applied onto fresh concrete by any workable method, such as by brush, by spraying or rolling, or by pouring and spreading. The composition is formulated so that it forms a film and dries in under four hours at temperatures greater than +4° C., is an effective water vapor barrier and sea,ant, and is weather and abrasion resistant for at least seven days. Compliance with ASTM C 309 requires that the coating composition restrict the loss of water to not more than 0.55 $kg/m^2$ in 72 hours. Furthermore, films formed from the coating composition must have sufficient abrasive resistance to being walked on and the like. Therefore, the coating composition should have Tg of from 25°–100° C., preferably 40°–75° C.

The film may be contacted with an enzyme capable of degrading the particular polysaccharide under conditions effective to remove the film of the curing composition from the cured concrete substrate. The preferred method of removing the film is obtained by flooding the coated concrete with an aqueous solution of enzyme specific to the polysaccharide incorporated into the applied curing composition followed by mechanical abrasion of the film. Alternatively, the film can be removed by flooding the concrete with water, waiting a sufficient period of time for the water to dissolve the film, and then removing the film from the concrete substrate, preferably by abrading the film.

The enzymes specific to a particular polysaccharide are well known in the art and are commercially available from such sources as Novo Nordisk Bioindustrials, Danbury, Conn. For example, alpha-amylase hydrolyzes amylose and amylopectin in starch and is commercially available under the tradename BAN from Novo. A hemicellulase that breaks down galactomannams, such as guar or locust bean gum, is commercially available under the tradename Gamanase from Novo. Both are available at different activity levels. In general, the enzyme is made up into an aqueous solution at a concentration sufficient to attack the polysaccharide present in the curing composition, and this solution is used to flood the surface of the concrete. The exact amount of enzyme to add to the flooding solution varies with such factors as the specific enzyme used, the activity of the enzyme, and the temperature conditions at which the flooding solution is used. This exact amount can be determined from the manufacturer's directions and from a minor amount of experimentation to optimize for specific field conditions. This determination and optimization are within the expertise of one skilled in the art.

EXAMPLES

In the following examples various polysaccharides were blended into latexes suitable for cement coating and curing compositions and tested for water barrier properties and ease of removability.

TEST PROCEDURES

The test for water barrier properties was performed in accordance with ASTM C 309 on fresh mortar samples that conformed to the requirements of ASTM C 156, which is hereby incorporated by reference in its entirety. Immediately after the samples were prepared, they were weighed to the nearest 1 g and placed in a curing cabinet at 37.8° C. and 32% relative humidity until disappearance of surface water. The specimens were again weighed and then the coating compositions were brushed onto the surface, applied at 0.2 L/m² (200 ft²/1 gal) at room temperature. The specimens were weighed and replaced into the curing cabinet for 72 hours. The specimens were again weighed and the loss in weight of volatiles (water) calculated and reported as kilograms lost per square meter of surface.

The test for ease of removability was performed as follows. The surface of mortar specimens prepared in accordance with ASTM C 156 were coated with the curing composition and cured at 37.8° C. and 32% relative humidity for 72 hours. All the coated films were dry to the touch before four hours. After curing, the specimens were flooded with a dilute solution of enzyme specific to the polysaccharide being tested. At the end of one hour, and at one-half hour intervals until failure, the coating was scraped with a metal spatula with light manual pressure. The film was considered to fail (be removable) when it easily lifted from the surface of the mortar. The time to removability was recorded in hours and the coatings that were removable within four hours were deemed to be the preferred compositions.

COMPOSITION OF THE SAMPLES AND FLOODING SOLUTIONS

Various samples were prepared with the compositions listed in the following tables. The polysaccharides are identified as follows: (starches A through G are cold water soluble) A is a tapioca dextrin; B is a waxy maize, derivatized with hydroxy propylate, enzyme converted; C is a waxy maize, acetylated and crosslinked; D is a waxy maize, derivatized with octenyl succinic anhydride and crosslinked; E is a waxy maize, acid converted; F is an unmodified corn, spray dried and agglomerated; G is a waxy maize, derivatized with hydroxy propylate, and acid converted; H is a cellulose, commercially available from Aqualon under the tradename Natrosol 250 LV; I is a guar gum known as Dycol 4500, commercially available from National Starch and Chemical Company, Bridgewater, N.J.; J is a yellow corn dextrin.

Nacrylic 78-6391 is a styrene/acrylic copolymer available from National Starch & Chemical Company, Bridgewater, N.J., formulated with 15% coalescent. Rhoplex is a styrene/acrylic copolymer available from Rohm & Haas, Philadelphia, Penn., formulated with 7% coalescent. Pliolite 7103 is a carboxylated styrene/acrylic copolymer available from GoodYear, Akron, Ohio, formulated with 10% coalescent; Nacrylic 78-6408 is an acrylic copolymer available from National Starch and Chemical Company, formulated with 12% coalescent; and Dow 242 is a styrene/butadiene copolymer available from Dow Chemical, Midland, Mich., formulated with 14% coalescent. The coalescent used for all the examples was 2,2,4-trimethyl-1,3-pentanediol mono isobutyrate (available as Texanol from Eastman Chemical).

The enzyme flooding solution for the curing compositions containing starch was prepared as a 5% solution of BAN 120L, an alpha-amylase from Novo, having an activity of 120 KNU/g (1 KNU is identified as the amount of enzyme that breaks down 5.26 grams of starch in one hour). The enzyme flooding solution for the curing compositions containing guar or cellulose was prepared as a 5% solution of Gamanase, a hemicellulase from Novo, having an activity of 1,500,000 VHCU/g (1 VHCU is a standardized unit based on the ability of the enzyme to reduce locust bean gum viscosity). More complete data on activity can be obtained from the supplier.

Example I: Nacrylic 78-6391, a styrene/acrylic copolymer, was blended with varying amounts of polysaccharide B, a derivatized and converted waxy maize, to a final solids content of 25%, and coated on fresh mortar specimens prepared as described in the test procedures. Coverage was at 4.9 m² per liter (200 ft² per gallon). The specimens were tested for water loss and ease of removability of the coating. The results are set out in Table I and show that enhanced removability can be obtained by the addition of polysaccharide to a curing composition. The data also show that the optimum polysaccharide content to obtain removability must be balanced against any loss in curing efficiency. As can be seen from Table I, when the starch content of this particular curing composition was greater than 20%, the curing efficiency decreased. However, it will be understood by those skilled in the art that each curing composition can be formulated to optimize the balance between curing efficiency and ease of removability depending on solids content, coverage rate, kind and amount of additives, and whether or not enzyme is added directly to the curing composition. In general, the optimum polysaccharide content for a given curing composition will be in the range of 5–40% by weight of total solids, preferably in the range of 10–20% by weight.

TABLE I

| Coating | Test | Comparison of Starch Level | | | | | | |
|---|---|---|---|---|---|---|---|---|
| | | % Starch Solids | | | | | | |
| | | 0% | 5% | 10% | 20% | 30% | 40% | 50% |
| Nacrylic/ waxy maize Total Solids 25% | Water loss kg/m²/ 72 hr | .47 | .53 | .48 | .49 | .69 | 1.08 | 1.26 |
| Coverage 200 ft²/gal | Removability (hours) | 6+ | 1+ | 1+ | 1 | ½ | ½ | ½ |

Example II: Based on the results of Example I, various latexes were blended with various polysaccharides in the weight range of 10–25% solids, and coated on fresh mortar specimens. The specimens were tested and results are set out in Table II. Examples 1–18 were based on Nacrylic 78-6391. The data show that with the particular latexes tested, and at 20% polysaccharide content, numerous starches, guar gum, and cellulose are effective at providing increased removability without significantly decreasing the water vapor barrier properties of the curing compositions.

TABLE II

Coating Compositions and Test Results

| Sample | Polymer | % Total Solids | Poly-saccharide | % | Water Loss kg/m²/72 hrs | Removability (hours) | Coating + 1% Enzyme Water Loss kg/m²/72 hrs | Coating + 1% Enzyme Removability (hours) |
|---|---|---|---|---|---|---|---|---|
| 1 | Nacrylic 78-6391 | 25 | — | 0 | 0.43 | 6+ | | |
| 2 | Nacrylic | 25 | A | 11.8 | 0.51 | 4+ | 0.52 | 2 |
| 3 | Nacrylic | 25 | A | 15 | 0.43 | 4+ | | |
| 4 | Nacrylic | 25 | A | 20 | 0.58 | 4 | 0.54 | 2 |
| 5 | Nacrylic | 25 | A | 25 | 0.87 | 3–4 | 0.42[a] | 2 |
| 6 | Nacrylic | 25 | B | 11.8 | 0.50 | 4+ | 0.56 | 2+ |
| 7 | Nacrylic | 25 | B | 15 | 0.42 | 4+ | | |
| 8 | Nacrylic | 25 | B | 20 | 0.44 | 1–2 | 0.45[a] | 1+ |
| 9 | Nacrylic | 25 | B | 25 | 0.69 | 3–4 | | |
| 10 | Nacrylic | 25 | E | 20 | 0.55 | 6+ | | |
| 11 | Nacrylic | 25 | H | 20 | 0.93 | 1 | | |
| 12 | Nacrylic | 25 | I | 20 | 0.59 | 1 | | |
| 13 | Nacrylic | 25 | J | 20 | 0.45 | 1 | .50 | 1 |
| 14 | Nacrylic | 20 | — | 0 | 0.48 | 6+ | | |

| Example | Polymer | % Total Solids | Poly-saccharide | % | km/m² 72 hrs | Removability (hours) | Water Loss kg/m² 72 hrs | Removability (hours) |
|---|---|---|---|---|---|---|---|---|
| 15 | Nacrylic | 20 | C | 20 | 1.011[b] | 6+ | | |
| 16 | Nacrylic | 20 | D | 20 | 0.52 | 5+ | | |
| 17 | Nacrylic | 20 | F | 20 | 0.48 | 5+ | | |
| 18 | Nacrylic | 20 | G | 20 | 0.98 | 2 | | |
| 19 | Rhoplex | 20 | — | 0 | 0.36 | 6+ | | |
| 20 | Rhoplex | 25 | B | 20 | 0.55 | 1 | | |
| 21 | Pliolite | 20 | — | 0 | 0.23 | 6+ | | |
| 22 | Pliolite | 25 | B | 20 | 0.43 | 1 | 0.36 | 1 |
| 23 | Dow 242 | 25 | | 0 | 0.51 | 6+ | | |
| 24 | Dow 242 | 25 | B | 20 | 0.49 | 1+ | | |
| 25 | Nacrylic 78-6408 | 20 | B | 20 | 0.76 | 1 | | |

[a]Coverage at 3.68 m²/liter (150 ft²/gal).
[b]Coverage at 4.29 m²/liter (175 ft²/gal).

What is claimed is:

1. An aqueous concrete curing composition, consisting essentially of in admixture:
   a latex of a polymer having a glass transition of greater than 25° C. and not more than 100° C. and comprising the polymerization product of at least one monomer(s) selected from the group consisting of acrylic and styrene monomers, said polymer present in an amount of about 95–60% by weight of total solids of the curing composition,
   a coalescing agent; and
   a polysaccharide in an amount of about 5–40% by weight of total solids of the curing composition; the curing composition restricting the loss of water to not more than 0.55 kg/m² in 72 hours.

2. The curing composition of claim 1 wherein the polysaccharide is substantially cold water soluble.

3. The curing composition of claim 2 wherein the cold water soluble polysaccharide is selected from the group consisting of starches, celluloses and gums.

4. The curing composition of claim 1 wherein the coalescing agent is hydrophobic.

5. An aqueous concrete curing composition, consisting essentially of in admixture:
   about 95–60% by weight of total solids of the curing composition of a polymer having a glass transition of greater than 25° C. and not more than 100° C. and comprising the polymerization product of at least one monomer(s) selected from the group consisting of acrylic and styrene monomers;
   about 5–40% by weight of total solids of the curing composition of a substantially cold water soluble polysaccharide selected from the group consisting of starches, celluloses and gums; and
   about 7–15% by weight of total solids of the curing composition of a coalescing agent;
   the curing composition restricting the loss of water to 0.55 kg/m² in 72 hours.

6. A method for curing concrete, comprising:
   (a) applying to a concrete substrate a curing composition comprising in admixture about 95–60% by weight of total solids of the curing composition of a polymer comprising the polymerization product of at least one monomer(s) selected from the group consisting of acrylic and styrene monomers; and about 5–40% by weight of total solids of the curing composition of a polysaccharide, the curing composition restricting the loss of water to not more than 0.55 kg/m² in 72 hours, thereby forming a film of the curing composition on the concrete substrate;
   (b) allowing the concrete to cure; and
   (c) removing the film from the concrete substrate.

7. The method of claim 6 wherein the removing step (c) comprises contacting the film with an enzyme reactive with the polysaccharide, allowing the enzyme to degrade the polysaccharide and removing the film from the concrete substrate.

8. The method of claim 7 wherein the enzyme is applied as an aqueous solution.

9. The method of claim 7 wherein mechanical abrasion is applied to the film after the enzyme has degraded the polysaccharide, thereby removing the film.

10. The method of claim 6 wherein the removing step (c) comprises flooding the film with water, waiting a sufficient time for the water to dissolve the film and abrading the film.

11. A method for curing concrete, comprising:

(a) applying to a concrete substrate a curing composition comprising in admixture about 95–60% by weight of total solids of the curing composition of a polymer comprising the polymerization product of at least one monomer(s) selected from the group consisting of acrylic and styrene monomers; and about 5–40% by weight of total solids of the curing composition of a polysaccharide, the curing composition restricting the loss of water to not more than 0.55 kg/m$^2$ in 72 hours, thereby forming a film of the curing composition on the concrete substrate;

(b) allowing the concrete to cure, (c) contacting the film with an aqueous solution of an enzyme reactive with the polysaccharide, (d) allowing the enzyme to degrade the polysaccharide; and (e) applying mechanical abrasion to the film after the enzyme has degraded the polysaccharide, thereby removing the film.

12. A method for curing concrete, comprising:

(a) applying to a concrete substrate a curing composition comprising in admixture about 95–60% by weight of total solids of the curing composition of a polymer comprising the polymerization product of at least one monomer(s) selected from the group consisting of acrylic and styrene monomers; and about 5–40% by weight of total solids of the curing composition of a polysaccharide, the curing composition restricting the loss of water to not more than 0.55 kg/m$^2$ in 72 hours, thereby forming a film of the curing composition on the concrete substrate;

(b) allowing the concrete to cure; and (c) flooding the film with water, waiting a sufficient time for the water to dissolve the film and abrading the film, thereby removing the film.

* * * * *